(12) United States Patent
Miyata

(10) Patent No.: US 8,437,042 B2
(45) Date of Patent: May 7, 2013

(54) IMAGE FORMING SYSTEM

(75) Inventor: Yuji Miyata, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 897 days.

(21) Appl. No.: 11/905,230

(22) Filed: Sep. 28, 2007

(65) Prior Publication Data

US 2008/0079969 A1    Apr. 3, 2008

(30) Foreign Application Priority Data

Sep. 28, 2006  (JP) ................................. 2006-265325

(51) Int. Cl.
*G06K 15/00* (2006.01)
*H04N 1/40* (2006.01)

(52) U.S. Cl.
USPC ............. 358/2.1; 358/1.1; 358/1.9; 358/1.18; 358/518; 358/522

(58) Field of Classification Search .................... 358/1.1, 358/1.9, 3.21–3.28
See application file for complete search history.

(56) References Cited

U.S. PATENT DOCUMENTS

| | | | | |
|---|---|---|---|---|
| 4,469,025 A | * | 9/1984 | Loffler et al. ................. | 101/171 |
| 4,671,661 A | * | 6/1987 | Ott ................................ | 356/402 |
| 5,930,009 A | * | 7/1999 | Sato et al. ..................... | 358/518 |
| 6,297,800 B2 | * | 10/2001 | Dagman ........................ | 345/601 |
| 6,317,848 B1 | * | 11/2001 | Sorens et al. .................. | 714/48 |
| 6,351,263 B1 | * | 2/2002 | Naoi .............................. | 345/589 |
| 7,027,187 B1 | * | 4/2006 | Zuber ............................. | 358/1.9 |
| 7,092,116 B2 | * | 8/2006 | Calaway ....................... | 358/1.18 |
| 7,253,917 B2 | * | 8/2007 | Umeda et al. ................. | 358/1.15 |
| 7,403,299 B2 | * | 7/2008 | Takahashi ..................... | 358/1.14 |
| 7,508,552 B2 | * | 3/2009 | Touura .......................... | 358/474 |
| 2002/0131070 A1 | | 9/2002 | Housel et al. | |
| 2002/0191216 A1 | * | 12/2002 | Umeda et al. ................. | 358/1.15 |
| 2004/0114189 A1 | * | 6/2004 | Kaku et al. .................... | 358/3.26 |
| 2006/0103887 A1 | * | 5/2006 | Enomoto et al. ............. | 358/296 |

FOREIGN PATENT DOCUMENTS

| | | |
|---|---|---|
| EP | 0 772 116 A1 | 5/1997 |
| JP | 03-114852 | 5/1991 |
| JP | 6-258907 | 9/1994 |
| JP | 7-87318 | 3/1995 |
| JP | 10-322562 | 12/1998 |
| JP | 2000-217007 | 8/2000 |
| JP | 2005-86709 | 3/2005 |
| JP | 2005-267485 | 9/2005 |

OTHER PUBLICATIONS

JPO Machine Translation of Ogusu et al. (JP06-258907 A).*
Japanese Office Action, with English translation, issued in Japanese Patent Application No. JP 2006-265325, mailed Sep. 2, 2008.
European Search Report issued in European Patent Application No. 07253812.7, mailed May 8, 2009.

* cited by examiner

*Primary Examiner* — Richard Zhu

(74) *Attorney, Agent, or Firm* — Banner & Witcoff, Ltd.

(57) ABSTRACT

According to aspects of the invention, there is provided an image forming system which is configured such that a user is allowed to set color adjustment parameters, and information image data representing the contents of the color adjustment parameters set by the user is generated. Then, the information image data is combined with main image data to generate combined image data. An image is printed based on the combined image data with the color being adjusted in accordance with the color adjustment parameters set by the setting unit.

15 Claims, 18 Drawing Sheets

FIG.2A

| COLOR ADJUSTMENT PARAMETER | PALETTE | BRIGHTNESS | RED | GREEN | BLUE |
|---|---|---|---|---|---|
| INITIAL VALUE (SETTING VALUE BEFORE EDITING) | XX | XX | XX | XX | XX |
| CURRENT VALUE | 1 | 0 | 0 | −2 | 0 |

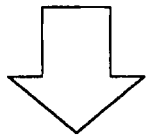

FIG.2B

| COLOR ADJUSTMENT PARAMETER | PALETTE | BRIGHTNESS | RED | GREEN | BLUE |
|---|---|---|---|---|---|
| INITIAL VALUE (SETTING VALUE BEFORE EDITING) | 1 | 0 | 0 | −2 | 0 |
| CURRENT VALUE | 1 | 0 | 0 | −2 | 0 |

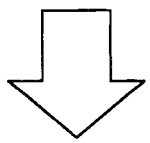

FIG.2C

| COLOR ADJUSTMENT PARAMETER | PALETTE | BRIGHTNESS | RED | GREEN | BLUE |
|---|---|---|---|---|---|
| INITIAL VALUE (SETTING VALUE BEFORE EDITING) | 1 | 0 | 0 | −2 | 0 |
| CURRENT VALUE | 3 | 1 | −1 | −2 | 0 |

| COLOR ADJUSTMENT PARAMETER | | PALETTE | BRIGHTNESS | RED | GREEN | BLUE |
|---|---|---|---|---|---|---|
| FOR CHARACTERS | INITIAL VALUE (SETTING VALUE BEFORE EDITING) | XX | XX | XX | XX | XX |
| | CURRENT VALUE | 3 | 1 | −1 | −2 | 0 |
| FOR IMAGES | INITIAL VALUE (SETTING VALUE BEFORE EDITING) | XX | XX | XX | XX | XX |
| | CURRENT VALUE | −1 | 0 | 0 | 1 | 0 |

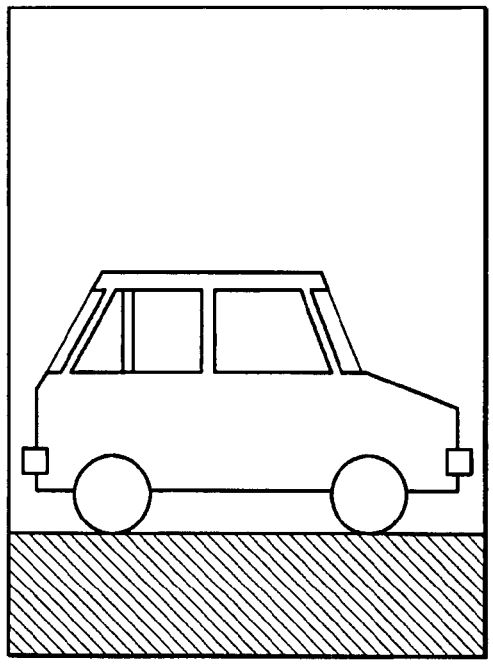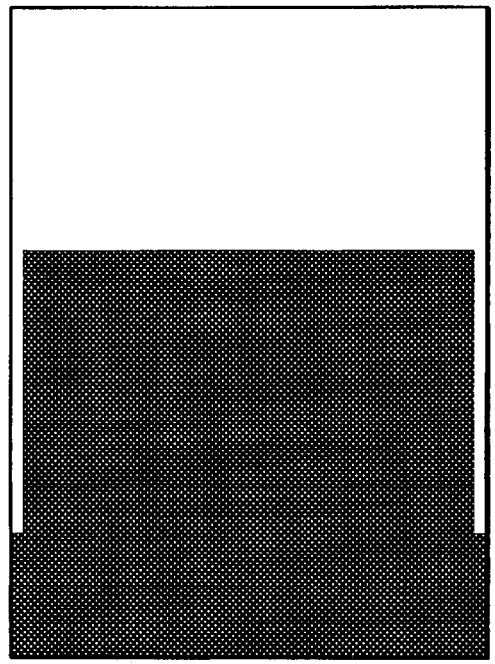
FIG.10A       FIG.10B
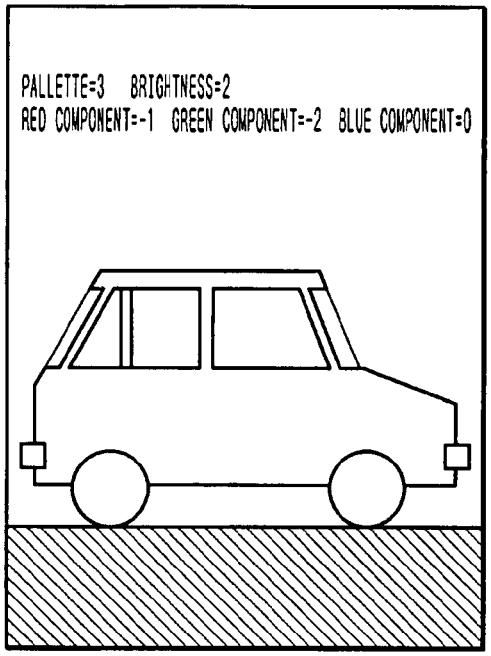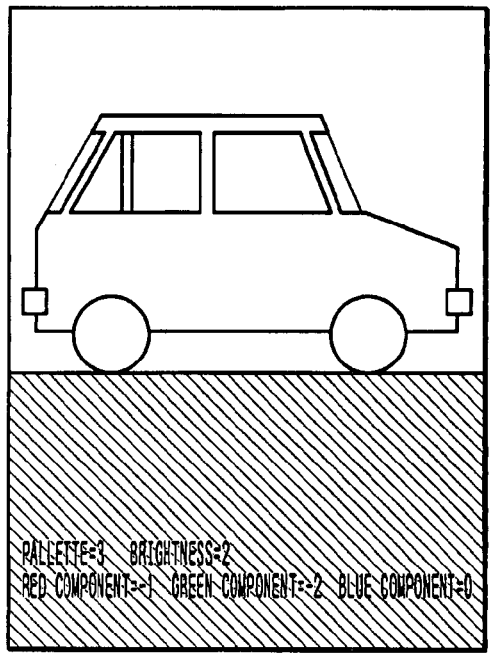
FIG.10C       FIG.10D

| COLOR ADJUSTMENT PARAMETER | | PALETTE | BRIGHTNESS | RED | GREEN | BLUE | | MODIFICATION FLAG |
|---|---|---|---|---|---|---|---|---|
| INITIAL VALUE | | xx | xx | xx | xx | xx | | ☒ |
| CURRENT VALUE | WORD PROCESSOR | 1 | 0 | 0 | -2 | 0 | | 1 |
| | CREATE GEOMETRY | 0 | 2 | 0 | 0 | -1 | | 0 |
| | OTHERS | 0 | 0 | 0 | -1 | 0 | | 1 |

IMAGE FORMING SYSTEM

CROSS-REFERENCE TO RELATED APPLICATIONS

This application claims priority from Japanese Patent Application No. 2006-265325, filed on Sep. 28, 2006, the entire subject matter of which is incorporated herein by reference.

BACKGROUND

1. Technical Field

The present invention relates to an image forming system which forms an image corresponding to an image data on a printing sheet, and specifically to an image forming system which can change a color tone arbitrarily by manipulating color adjustment parameters.

2. Related Art

Conventionally, an image forming device such as a color printer is configured to express various colors by using a plurality of kinds of ink or toner of various colors which are different from each other (hereinafter, referred to as "color component") and change a rate of blending these color components.

However, since printed colors are affected by various factors, even if a rate of blending color components is constant, the printed colors are not necessarily constant. In addition, a favorite of color varies depending on individuals. Therefore, the image forming device is generally provided with a color adjustment function.

The color adjustment function is a function to increase or reduce the blend rate of specific color components more than or less than a preliminarily setup rate so as to print in a color tone a user desires. Generally, such a change is made by adjusting color adjustment parameters representing amount of color components.

There is known an image forming device which can print typical test patterns including a numerical representation which shows setup color adjustment parameters (such as concentration) in numerical values and images corresponding to setup color adjustment parameters (such as a gray scale) in order to allow a user to recognize the change of a color tone of printed image according to changed color adjustment parameters. An example of such a technique is disclosed in Japanese Patent Provisional Publication No. HEI 7-87318.

However, a color adjustment is a matter of sense, and it is difficult to imagine how the actual color tone would be from printed results of typical test patterns. Therefore, it is necessary to print actual image data instead of or in addition to test patterns (hereinafter, referred to as "test printing").

That is, while varying setup of color adjustment parameters, test printings are executed with changing the parameters, and results are compared. Then, the color adjustment parameters are finally adopted as those at the time when the desirable color tones is obtained.

When such a test printing is performed, whenever setup of color adjustment parameters is changed, it is necessary to write down or print the test patterns for later reference. Namely, every time when the setup is changed, the test patterns and actual image data are repeatedly printed as test printing (or write down contents of color adjustment parameters). Therefore, there has been a problem where troublesome work is required.

SUMMARY OF THE INVENTION

The invention is advantageous in that an improved image forming system is provided with which system the color adjustment operation can be performed relatively easily.

According to aspects of the invention, there is provided an image forming system which is configured such that a user is allowed to set color adjustment parameters, and information image data representing the contents of the color adjustment parameters set by the user is generated. Then, the information image data is combined with main image data to generate combined image data. An image is printed based on the combined image data with the color being adjusted in accordance with the color adjustment parameters set by the setting unit.

According to the above configuration, printing of a color-adjusted image and printing of the color adjustment parameters can be executed simultaneously. Thus, a conventional test patterns are not necessarily printed.

According to other aspects, there is provided a method of printing an image. The method includes the steps of generating information image data representing contents of the color adjustment parameters set by the user, combining the information image data with the main image data to generate combined image data, and printing the image based on the combined image data with the color being adjusted in accordance with the color adjustment parameters set by the setting unit.

According to further aspects of the invention, there is provided a recording medium containing a computer program representing instructions. When the computer executes the program, the computer operate to generate information image data representing contents of the color adjustment parameters set by the user, combine the information image data with the main image data to generate combined image data, and print the image based on the combined image data with the color being adjusted in accordance with the color adjustment parameters set by the setting unit.

BRIEF DESCRIPTION OF THE ACCOMPANYING DRAWINGS

FIGS. 2A-2C show a configuration of color adjustment parameters and how to use the parameters.

FIG. 10A is an example of a main image.

FIG. 10B shows an image area of the main image.

FIG. 10C is an example of a print image when the information image is inserted to the marginal space of the main image.

FIG. 10D shows an example of a printed image in the case that the information image is inserted to the predetermined location of the main image.

DETAILED DESCRIPTION OF THE EMBODIMENTS

Hereinafter, referring to the accompanying drawings, embodiments according to the invention are described.

<Overall Configuration>

Figure 1:
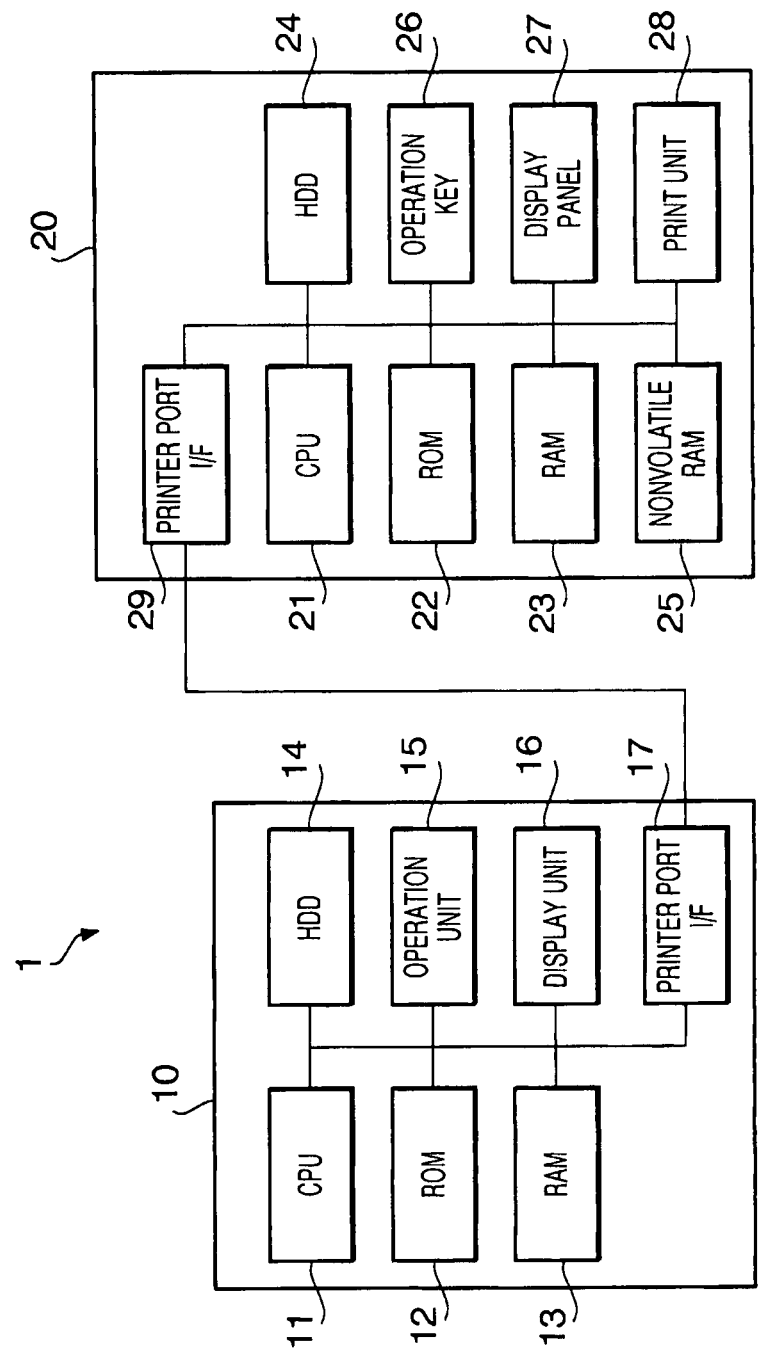
FIG. 1 is a block diagram showing a configuration of an image forming system according to the embodiment of the invention.

FIG. 1 is a block diagram showing a configuration of an image forming system 1 according to the invention. As shown in FIG. 1, the image forming system 1 is provided with a personal computer 10, as one example of an information processing device, with which documents and images are created/edited, and further, print data representing bitmap data which developed based on the edited documents and images is generated. The image forming system 1 also includes a printer 20 as one example of a printing device which executes printing according to print data generated by the personal computer 10.

The personal computer 10 is configured mainly with a widely known micro computer which includes a CPU (Central Processing Unit) 11, a ROM (Read Only Memory) 12, a RAM (Random Access Memory) 13, an HDD (Hard Disk Drive) 14. Further, the personal computer is provided with a display unit 16 which has an LCD (Liquid Crystal Display) or a CRT (Cathode Ray Tube) that displays images and characters, an operation unit 15 which has a mouse for moving a pointer that indicates a specific part of the display unit 16 and a key board for inputting characters and symbols, etc., and a printer port I/F (Interface) 17 for connecting the printer 20 to the personal computer 10 through a connecting cable.

The HDD 14 stores application programs used for generating documents and drawings, and a program which generates image data for printing from the documents and drawings generated by the application programs.

According to the embodiment, the HDD 14 has a memory area where current setting values of color adjustment parameters which are used in adjusting colors of images to be printed by the printer 20, and a memory area for storing initial values (setting values before editing) which are necessary in editing color adjustment parameters (described later).

FIG. 2A schematically shows a structure of the memory area for storing the color adjustment parameters. The color adjustment parameters are relative values (in the embodiment, values between −31 and +31) with respect to a preliminarily setup default values (=0) which represent respective intensity of palette, brightness, and color components (red, green, blue).

The printer 20 is also configured with mainly a widely known micro computer which includes a CPU 21, a ROM 22, a RAM 23 and an HDD 24. The printer 20 further includes a nonvolatile RAM 25 which stores various setup information, etc., which is input by a user, an operation keys 26 which are used to select functions the printer 20 has, a display panel 27 which displays contents of operation and/or status of operation, a print unit which prints characters and images, in color, on a printing sheet such as papers, and a printer port I/F 29 for connecting the printer 20 to the personal computer 10 via a connection cable.

<Color Adjustment Parameter Editing Process>

Next, processes for color adjustment of images to be printed by the printer 20 will be described referring to flowcharts. The processes are performed as corresponding programs are executed by the CPU 11 of the personal computer 10.

Figure 3:
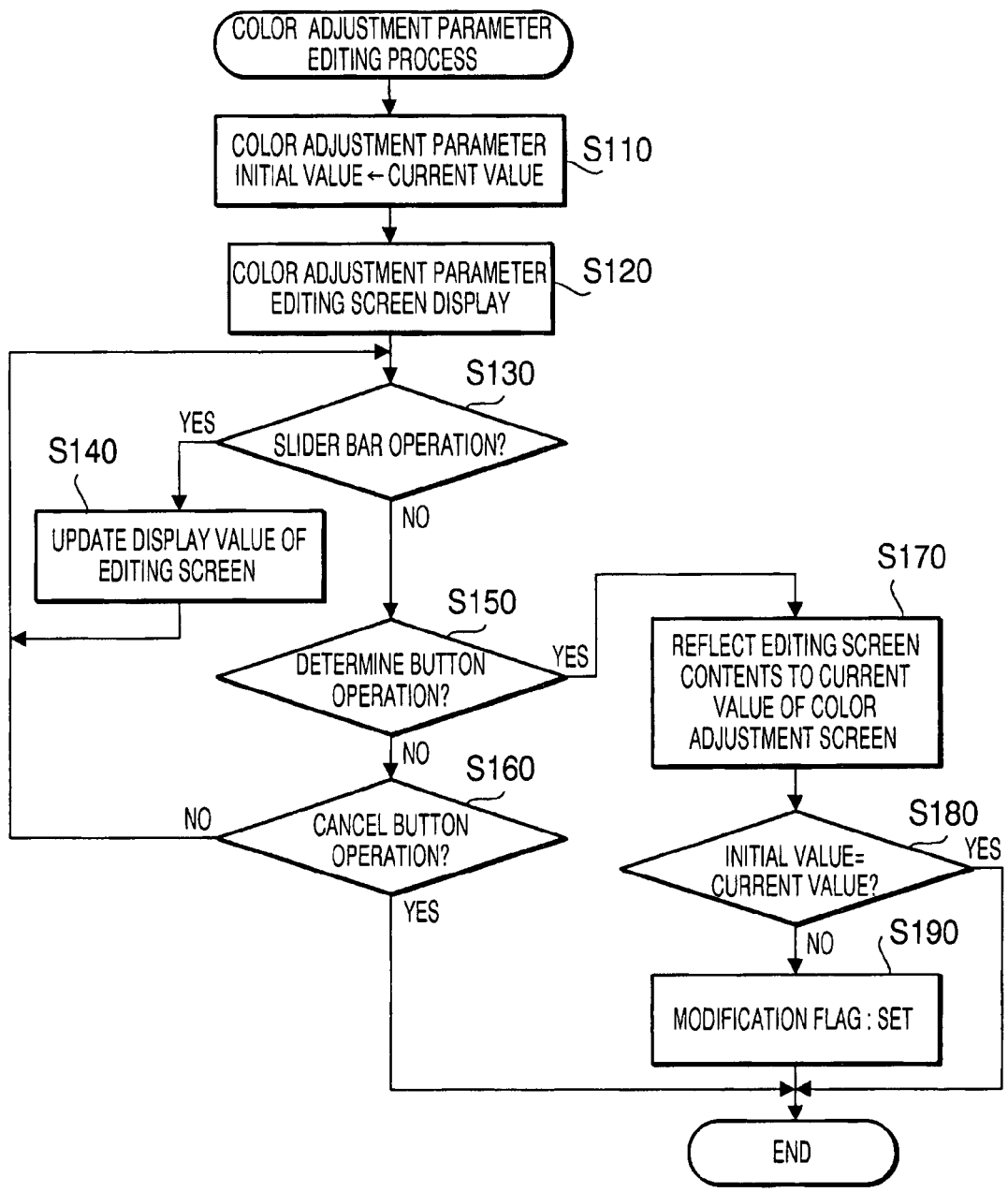
FIG. 3 is a flowchart showing a color adjustment parameter editing process in the first embodiment.

FIG. 3 is a flowchart showing a color adjustment parameter editing process. The process is activated when a color adjustment parameter editing function is designated by an user through an operation unit 15 of the personal computer 10.

When the process is activated, as can be seen in FIG. 3, firstly, in S110, current setting values of color adjustment parameters stored in the HDD 14 are copied to the initial value area (see FIGS. 2A and 2B: FIG. 2A showing a status before copying, and FIG. 2B showing a status after copying). In S120, a color adjustment parameter editing screen (hereinafter, referred to as "editing screen") is displayed on the display unit 16.

Figure 4A:
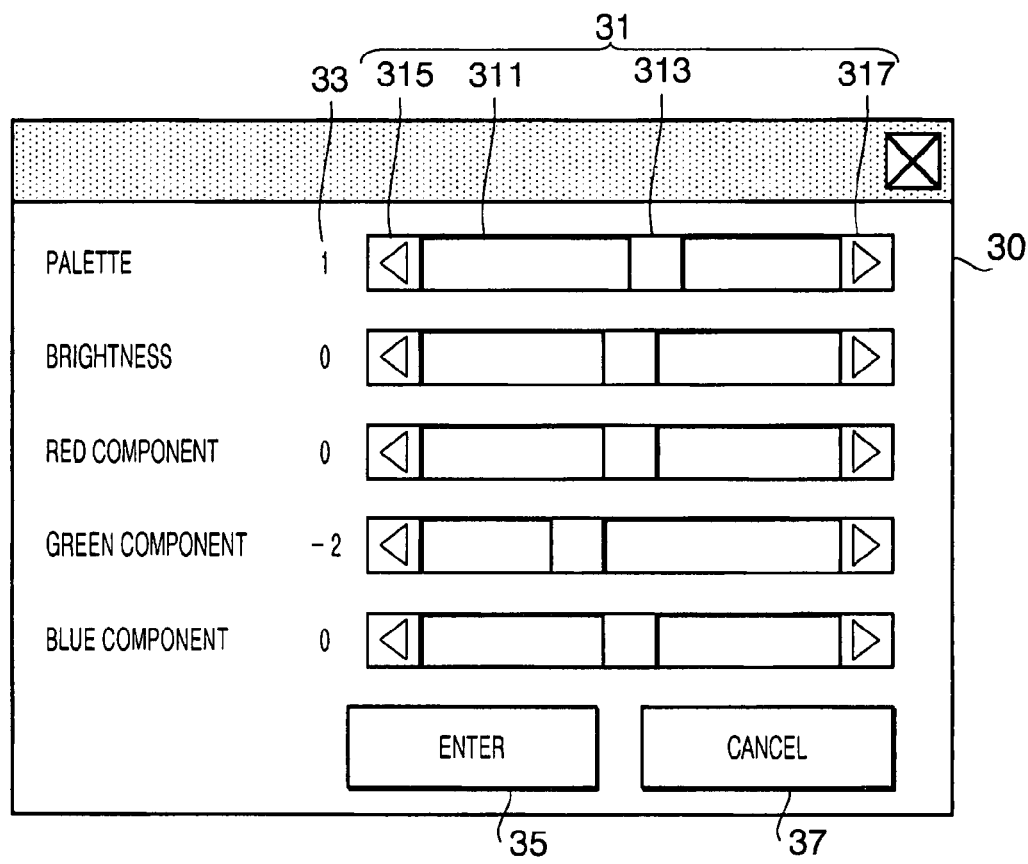
FIGS. 4A and 4B show a configuration of the color adjustment parameter editing screen in the first embodiment.
Figure 4B:
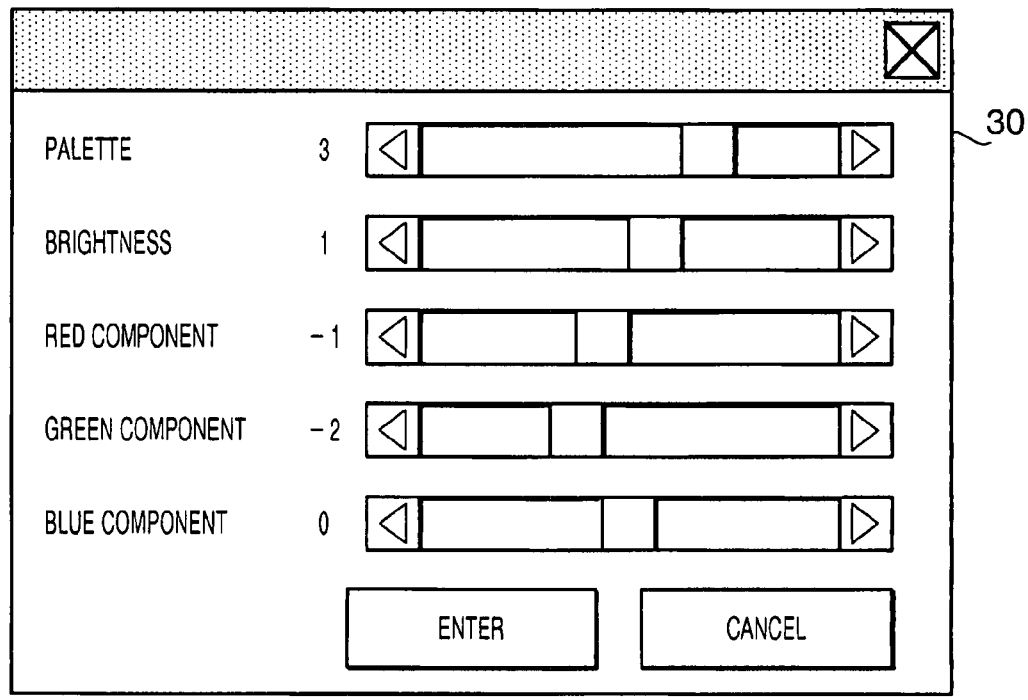

As shown in FIGS. 4A and 4B, the editing screen 30 includes five (5) slider bars 31 respectively corresponding to the adjustment parameters (palette, brightness, red component, green component and blue component), display areas 33 for displaying numerical values set with the slider bars 31, an enter button 35 which is operated (e.g., clicked using the mouse) when numerical values changed using the slider bars 31 are stored and editing is finished, and a cancel button 37 which is operated (clicked using the mouse) when editing is to be finished without storing the changed numerical values.

Each of the slider bars is of a well known type and has a movable pointer 313 which moves from side to side within a frame 311, a decrease button 315 and an increase button 317 which are placed on either side of the frame 311. The parameter value is increased or decreased by a predetermined amount for every operation (click) of the increase button or the reduction button and the pointer 313 is moved to the location corresponding to the parameter value.

An initial display location of the pointer 313 of the slider bar 31 is a location corresponding to the current setup value of the color adjustment parameter corresponding to the slider bar 31, which is stored in the HDD 14. The slider bars 31, the enter button 35 and the cancel button 37 are operated through the operation unit 15 (i.e., a key board and/or a mouse).

In S130, the process judges whether one of the slider bars 31 is operated. When the slider bar 31 is operated, the process goes to S140, updates a numerical value displayed in the display area of the editing screen according to the status of the slider bar 31, and goes back to S130.

When the slider bar 31 is not operated, the process goes to S150, and judges whether the button 35 is clicked. If the determine button 35 has been clicked, the process goes to S170, settings of the editing screen are reflected to the current setting values of the color adjustment parameters. For example, if the editing screen 30 is changed from a status shown in FIG. 4A to a status shown in FIG. 4B, the current setup value of the color adjustment parameters stored in the HDD 14 are updated from the status shown in FIG. 2B to the status shown in FIG. 2C.

In S180, the process judges whether the current setting values are the same as the initial values which are set in S110.

Then, if the current setting values are different from the initial values, the process goes to S190, sets a change flag to indicate that the color adjustment parameters have been changed, and the process is terminated. If the current setting values are the same as the initial values, since the color adjustment parameters have not been changed, the process is terminated without doing anything.

In S150, if the enter button 35 has not been clicked, the process goes to S160, where the process judges whether the cancel button 37 has been clicked. If the cancel button 37 has not been clicked, the process goes back to S130. When the click button 37 has been clicked, the process is terminated without doing anything.

As described above, when the color adjustment parameters are changed, the editing screen 30 is displayed, and the enter button 35 is clicked after setting up each parameter to a desired value by manipulating the slider bars 31 in the editing screen 30. Further, when the color adjustment parameters have been changed, the change flag is automatically set.

<Print Process>

Figure 5:
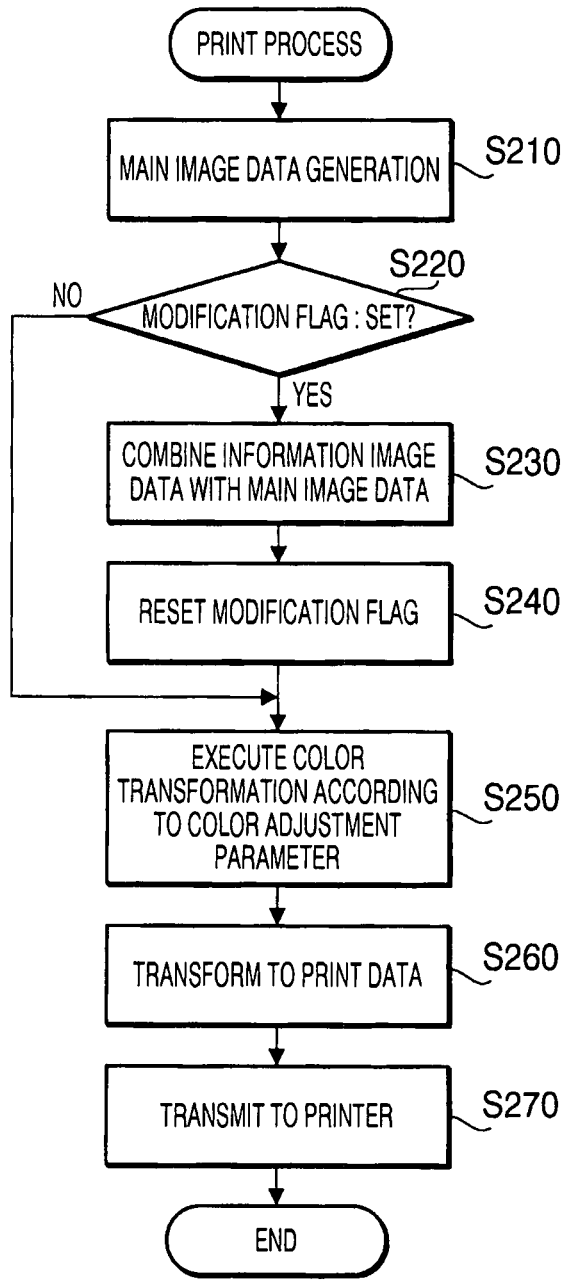
FIG. 5 is a flowchart showing a print process in the first embodiment.

FIG. 5 is a flowchart showing a print process for generating print data to be transmitted to the printer 20.

The print process is activated when print instructions are received from various applications executed by the personal computer 10. When the print process is activated, as shown in FIG. 5, firstly, in S210, image data from which the print data is generated (hereinafter, referred to "main image data") is generated. Specifically, a painting process is executed according to the print instruction, and data which represents palette, brightness, intensity of each of the R (red), G (green), B (blue) components in a value represented by a multiple steps (e.g., 256 step values) for each pixel is generated.

Next, in S220, the process judges whether the change flag has been set. When the change flag is set, as the color adjustment parameters have been changed, the process goes to S230. When the change flange is not set, as the color adjustment parameters have not been changed, the process goes to S250.

In S230, image data which is to be printed with predetermined color characters according to contents of the current setting values of the color adjustment parameters (hereinafter, referred to "information image data") is generated and combined with the main image data generated in S210. Next, in S240, the change flag is reset (i.e., set to represent that the change has not been made), and the process goes to S250.

Figure 6A:
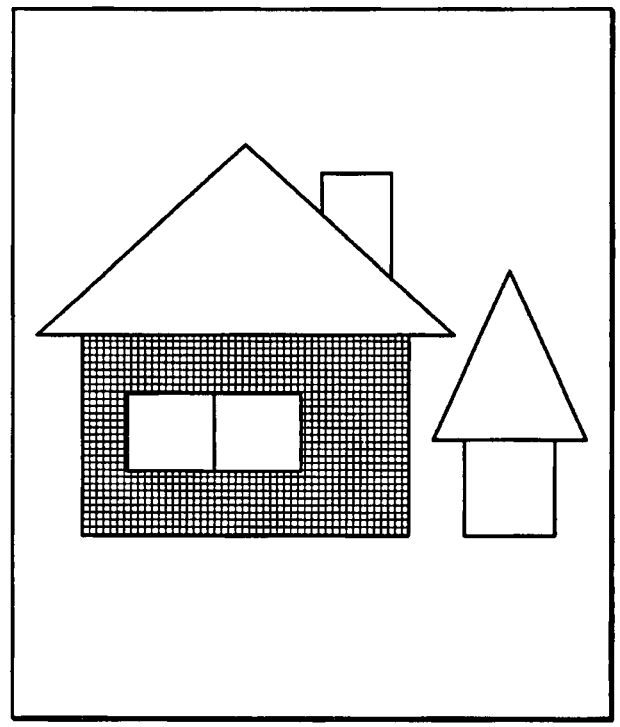
FIG. 6A shows an example of a main image.
Figure 6B:
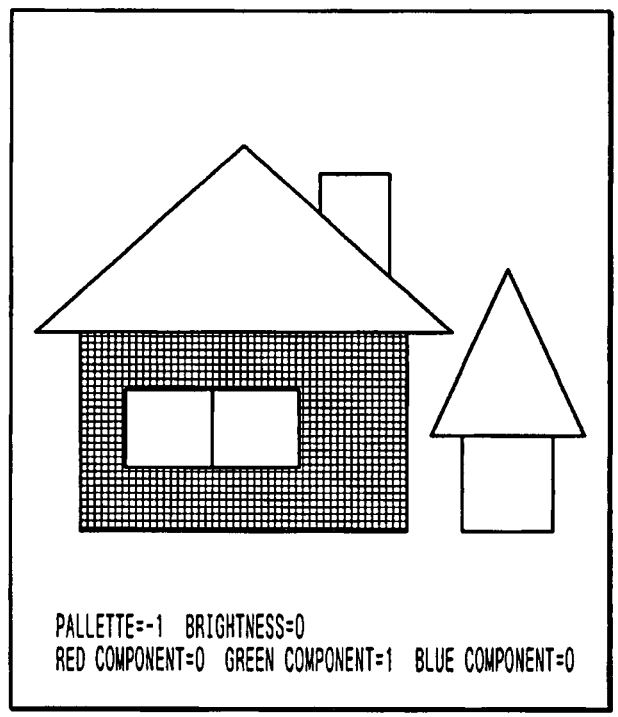
FIG. 6B shows an example of a print image in which the main image shown in FIG. 6A with the addition of an information image.

It is noted that the information image data is generated so that an information image (image printed according to the information image data) is placed at a predetermined location within a main image (an image printed according to the main image data). For example, when FIG. 6A is a main image, an information image (i.e., an image where settings of the color adjustment parameters are represented with letters/characters) is located in a lower part of the main image as shown in FIG. 6B.

In S250, color transformation of the image data is executed according to the current setting values of the color adjustment parameters. Then, in S260, the color transformed image data is transformed to print data (bitmap data). In particular, data represented by R, G, B components is transformed data represented by Y (yellow), M (magenta), C (Cyan), K(black) components, and the data is further transformed into data which the printer 20 can read. A data compression is also executed in S260.

Then, in S270, the print data is transmitted to the printer 20 through the printer port I/F 17, and the process is terminated. Meanwhile, the printer 20 which has received the print data executes printing operation according to the received print data. With this printing operation, an image which is the main image associated with the information image is obtained when the color adjustment parameters are changed as shown in FIG. 6B. When the color adjustment parameters have not been changed, an image consists of the main image is obtained as shown in FIG. 6A.

As described above, by using the image forming system 1, if the color adjustment parameters have been changed, since the image printed based on the print request by the application is printed together with information on color adjustment parameters, typical (i.e., conventional) test patterns are not necessarily printed separately, and a work load can be reduced in color adjustment.

Next, a second embodiment is explained.

In the second embodiment, the only differences with respect to the first embodiment are: configuration of color adjustment parameters stored in the HDD 14; configuration of editing screen which is displayed in the color adjustment parameter editing process S120; data format of the information image data which is composed with the main image data in the print process S230; and contents of color transformation process which is executed in the print process S250. Therefore, the same configurations as in the first embodiment are given the same symbols/step numbers, and only the different portions will be explained.

<Color Adjustment Parameters/Editing Screen>

Figures 7A, 7B:
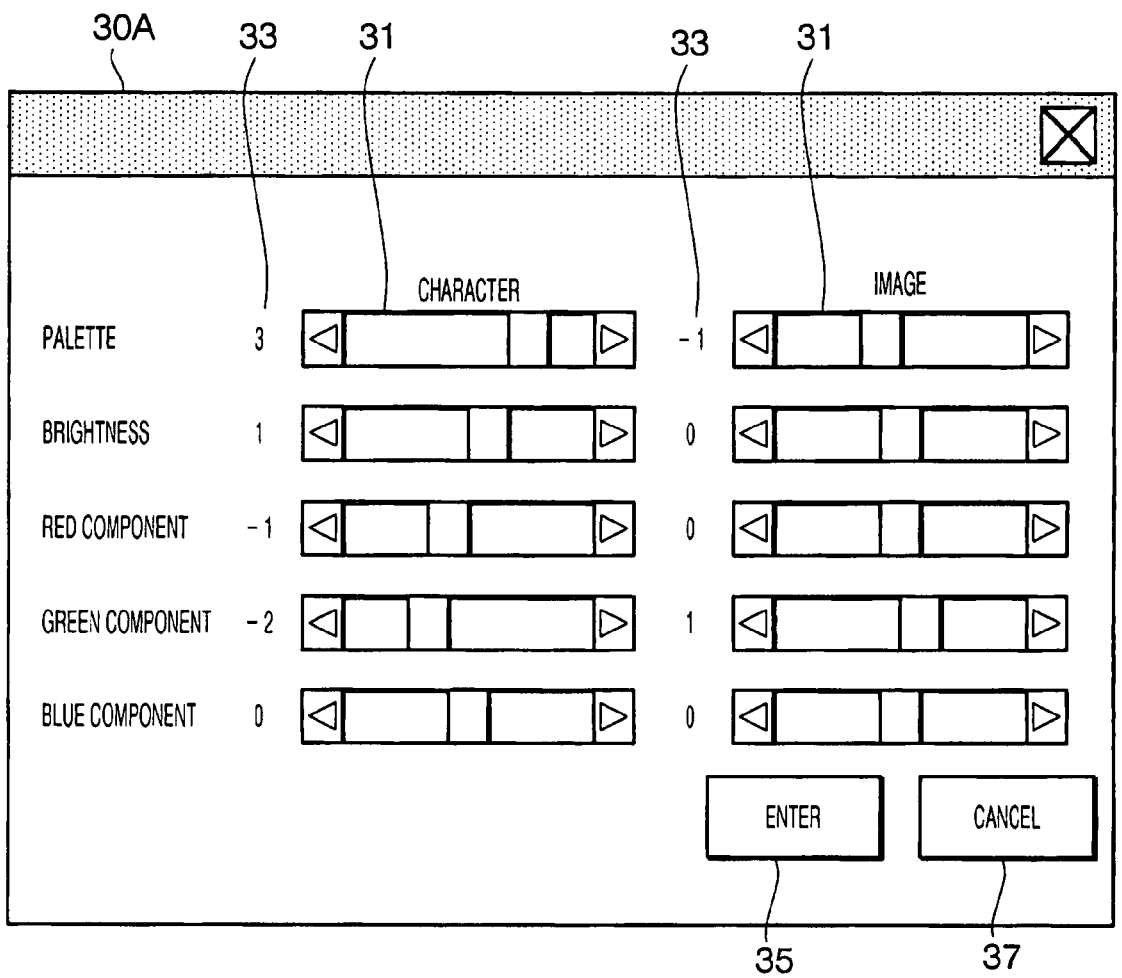
FIG. 7A shows a configuration of color adjustment parameters in the second embodiment.
FIG. 7B shows a color adjustment parameter editing screen in the second embodiment.

FIG. 7A shows a configuration of color adjustment parameters according to the second embodiment. FIG. 7B is an illustration which shows a configuration of an editing screen according to the second embodiment.

As can been seen in FIG. 7A, the adjustment parameters are prepared separately for characters and for images. It should be noted that "characters" here includes letters, symbols and the like. The HDD 14 has the current setting value area and initial value (setting values before editing) area for each of the "characters" and "images."

As shown in FIG. 7B, the editing screen 30A is configured similarly as the editing screen 30 in the first embodiment, except that the slider bars 31 include totally 10 bars, five bars each for color adjustment parameters of characters and color adjustment parameters of images.

Namely, the editing screen 30A is configured such that the user can set up color adjustment parameters separately for characters and for images.

<Print Process>

Figure 8:
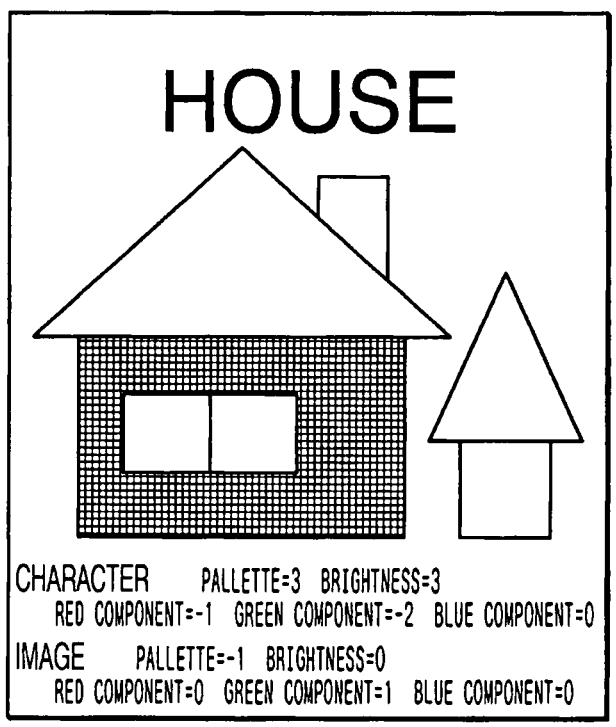
FIG. 8 is an example in which the information image is added to the main image.

Then, the information image which is composed with the main image in the print process S230, as can be seen in FIG. 8, indicates two kinds of color information parameters. The indication is to clearly identify the correspondence between two sets of color information parameters and characters or images, respectively.

In the print process S250, as shown in FIG. 8, if the main image has both of character part (a part "HOUSE" in FIG. 8) and image part (other parts), regarding image data corresponding to the character part, by using color adjustment parameters for characters, color transformation is executed, and regarding image data corresponding to the image part, by using color adjustment parameters for image, color transformation is executed.

<Effect>

According to the second embodiment, the image forming system 1 enables the user to set the color adjustment parameters for characters and color adjustment parameters for images separately Therefore, it is possible to make color adjustment in more detailed manner within the same image.

Next, a third embodiment according to the invention is explained.

In the third embodiment, since only a part of print process is different from that of the first embodiment, the difference of the print process is mainly explained.

<Print Process>

Figure 9:
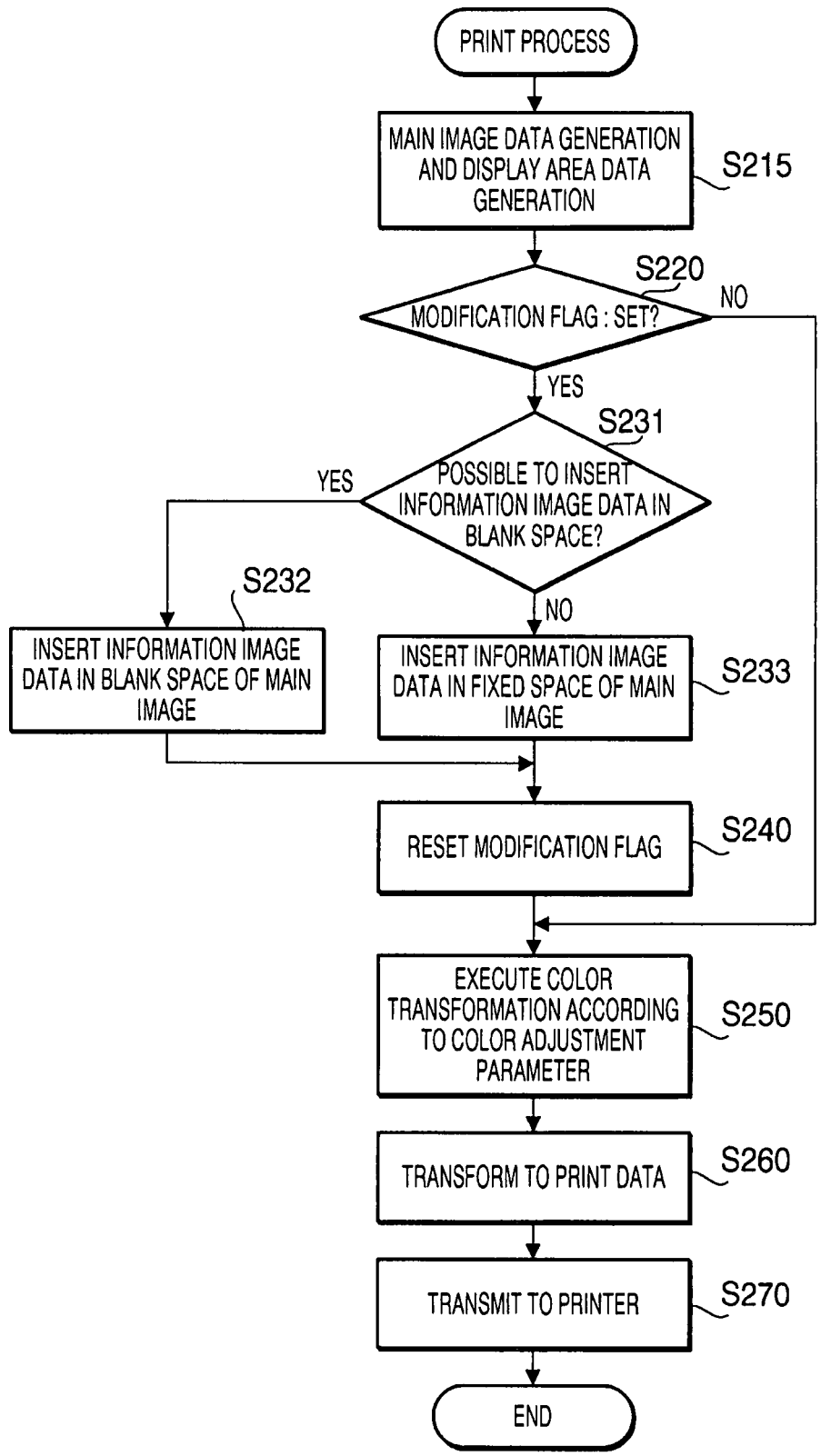
FIG. 9 is a flowchart showing a print process in the third embodiment.

FIG. 9 is a flowchart showing the print process according to the third embodiment.

As can be seen in FIG. 9, the step S210 in the first embodiment has been changed to a step S215, and the step S230 in the first embodiment has been changed to steps S231 to S233. Other steps of the print process are similar to the process in the first embodiment.

When the print process according to the third embodiment is started, firstly, in S215, main image data is generated, and further, drawing area data is generated. The drawing area data is an image data representing an area (i.e., a drawing area) where characters or figures are formed in the main image. For example, in the case that the main image is an image shown in FIG. 10A, the area which is hatched as shown in 10B is the drawing area.

In S231, the process judges whether information image is to be inserted (or can be inserted) to the other part besides drawing area (i.e., marginal area of the main image). Then, if the information image is to be inserted in the marginal area (or can be inserted in the marginal area), the process goes to S232. In S232, the information image data is combined with the main image data so that the information image is inserted in the marginal area of the main image (see FIG. 10C). On the other hand, if the information image is not to be inserted in the marginal area (or cannot be inserted in the marginal area), the process goes to S233. In S233, the information image data is combined with the main image data so that the information image is inserted in the predetermined fixed area of the main image. In this example, the predetermined fixed area is a lower part of the main image (see FIG. 10D).

According to the third embodiment, if the information image is inserted in the marginal area of the main image, the user can recognize both the main image and the information image easily.

Next, a fourth embodiment is explained.

In the fourth embodiment, configuration of editing screen displayed in color adjustment parameter editing process S120, and parts of color adjustment parameter editing process and print process are different from those of the first embodiment. Therefore, the same configurations in the first embodiment are given the same symbols/step numbers without further explanation, and the different portions are mainly explained. It should be noted that there is a case where a print quality is preferably determined based on a plurality of print images which are printed based on a plurality of pieces of different main image data. The fourth embodiment is configured such that the information image is printed repeatedly.

<Configuration of Editing Screen>

Figure 11:
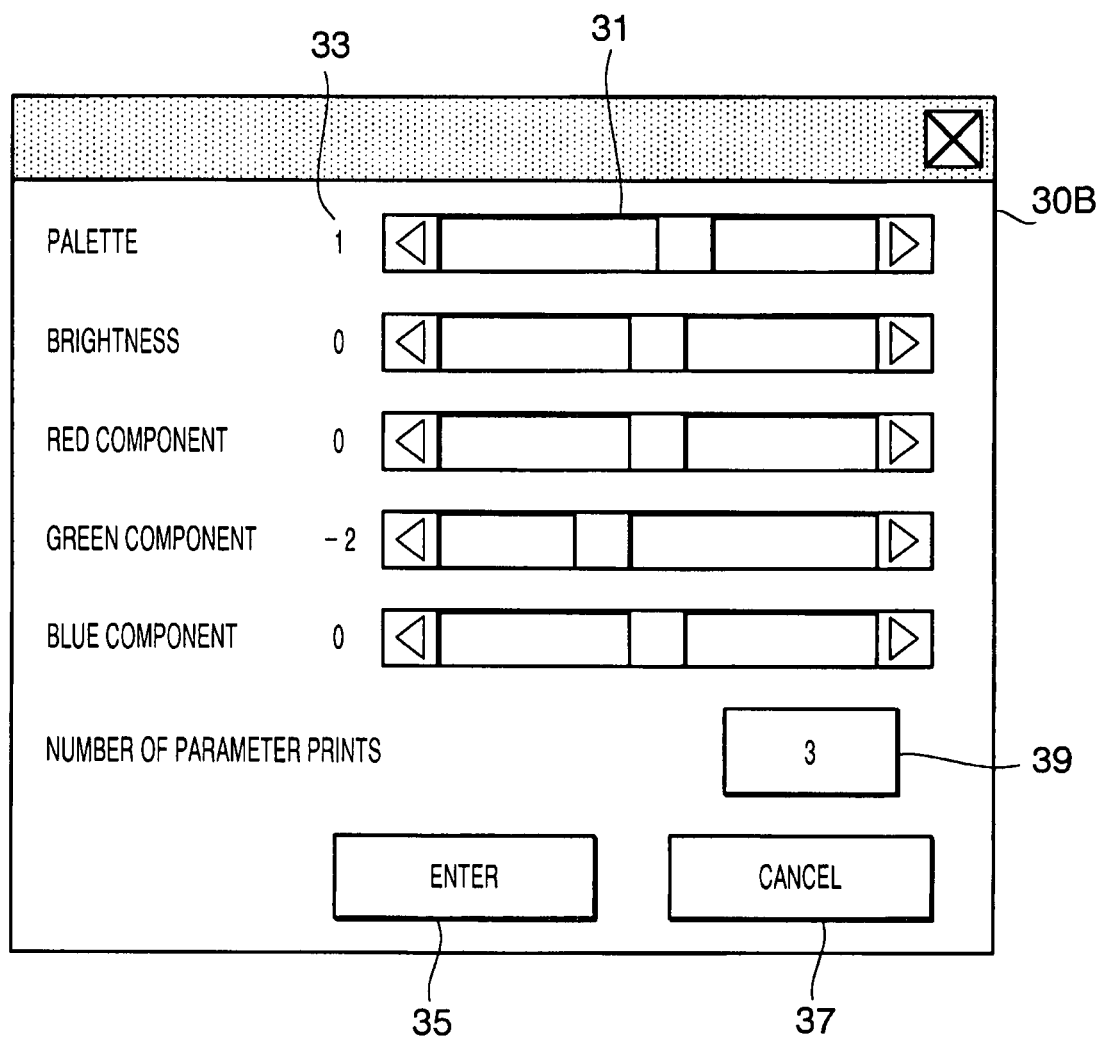
FIG. 11 shows a configuration of a color adjustment parameter editing screen in the fourth embodiment.

FIG. 11 is an illustration showing a configuration of the editing screen 30B according to the fourth embodiment.

As shown in FIG. 11, the editing screen 30B is configured similar to the editing screen 30 except that a text box 39 to set the number of printing the information image together with the main image (hereinafter, referred to as a "parameter print count") is added when the color adjustment parameters are changed.

<Color Adjustment Parameter Editing Process>

Figure 12:
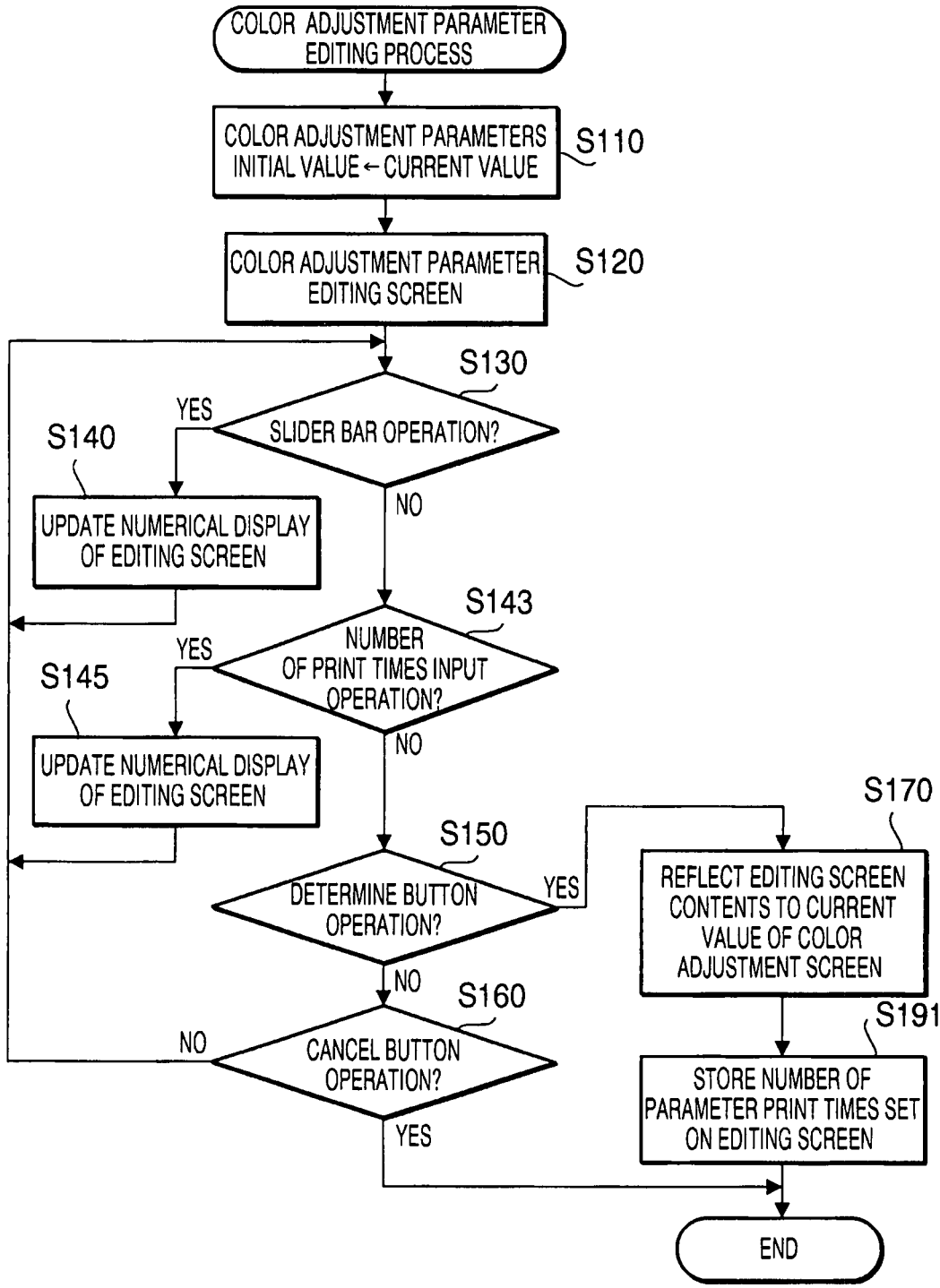
FIG. 12 is a flowchart showing a color adjustment parameter editing process.

FIG. 12 is a flowchart showing the color adjustment parameter editing process according to the fourth embodiment.

As shown in FIG. 12, the color adjustment parameter editing process according to the fourth embodiment is different compared to the color adjustment parameter editing process according to the first embodiment in that steps S143, S145 have been newly added, steps S180, S190 have been changed to a step S191, and editing screen 30B is displayed in process S120.

Then, in the process shown in FIG. 12, when the process judges that the slider bars 31 are not operated in S130, the process goes to S143, the process judges whether an operation to input parameter print count to the text box 39 is executed. When the slider bars 31 have not been operated, the process goes to S150.

If the operation to input parameter print count to the text box 39 is done, the process goes to S145. According to the input value, the number displayed in the text box 39 of the editing screen 30B is updated, and the process goes back to S130.

In S191, a change flag is not set, but the number displayed in the text box 39, i.e., the parameter print count, is stored, and the process shown in FIG. 12 is terminated.

As described above, not only color adjustment parameters but also the parameter print count can be set using the editing screen 30B. When the enter button 35 is clicked, not only setup contents of the slider bars 31 are reflected to the current setting values of the color adjustment parameters, but also the number indicated in the text box 39 are stored as the parameter print count.

<Print Process>

Figure 13:
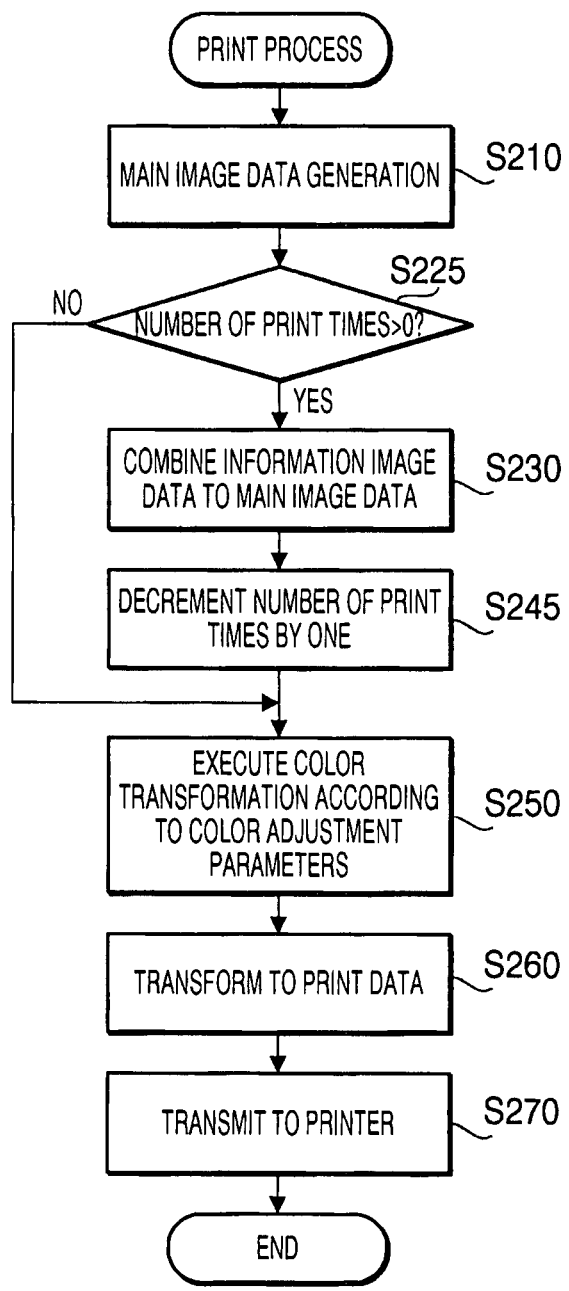
FIG. 13 is a flowchart showing a print process according to the fourth embodiment.

FIG. 13 is a flowchart showing a print process according to the fourth embodiment.

As shown in FIG. 13, the print process according to the fourth embodiment is different compared to the print process of the first embodiment in that the step S220 has been changed to a step S225, and the step S240 has been changed to a step S245.

When the main image has been generated in S210, in S225, the process judges whether the parameter print count is greater than 0. If the parameter print count is greater than 0, the information image data is combined with the main image data in S230. Then, the parameter print count is reduced (decremented) by one in S245, and the process goes to S250.

If the parameter print count is equal to or less than 0, the information image will not be inserted to the main image, and the process goes to S250 without doing any operation. Namely, when the color adjustment parameters have been changed, the information image is inserted into the main image repeatedly, by the time indicated by the parameter print count. Thus, the indications of color adjustment parameters are printed over the main image.

According to the fourth embodiment, the usability of the image forming system 1 is improved, since a user can set a desired number of times, by which the contents of the color adjustment parameters are printed repeatedly over the main image.

Next, a fifth embodiment of the invention will be explained.

In the fifth embodiment, a configuration of color adjustment parameters stored in the HDD 14, a configuration of editing screen displayed in color adjustment parameter editing process, a color adjustment parameter editing process, and a print process are different from corresponding configurations of the first embodiment.

<Color Adjustment Parameters/Editing Screen>

Figures 14A, 14B:
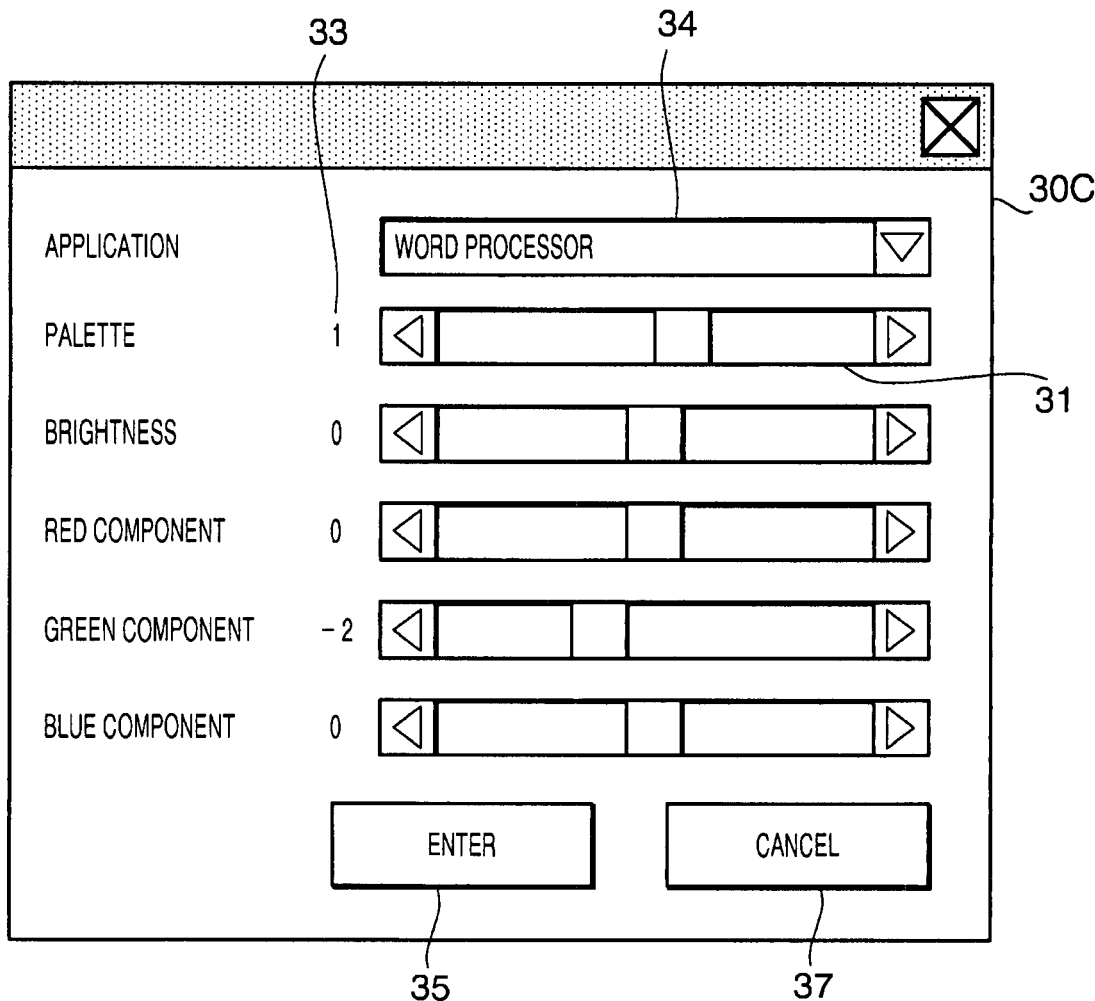
FIG. 14A shows a configuration of color adjustment parameters in the fifth embodiment.
FIG. 14B shows a configuration of a color adjustment parameter editing screen.

FIG. 14A shows a configuration of data structure of the color adjustment parameters according to the fifth embodiment. FIG. 14B shows a configuration of an editing screen 30C according to the fifth embodiment.

As can been seen in FIG. 14A, the adjustment parameters are prepared separately for each application. The HDD 14 has areas to store the current setting values of each application ("WORD PROCESSOR", "DRAWING", "OTHERS"), and areas, which are commonly used, to store initial values (i.e., initial values before setting) of the application for which the adjustment parameters are being set. The HDD 14 has also areas storing the change flags for respective applications.

As shown in FIG. 14B, the editing screen 30C is configured similarly to the editing screen 30 in the first embodiment except that a text box 34 to indicate an application of which color adjustment parameters to be changed is added.

That is, on the editing screen 30C, it is possible to select one of application, and change color adjustment parameters which are used when prating is executed according to print instructions from the application.

<Color Adjustment Parameter Editing Process>

Figure 15:
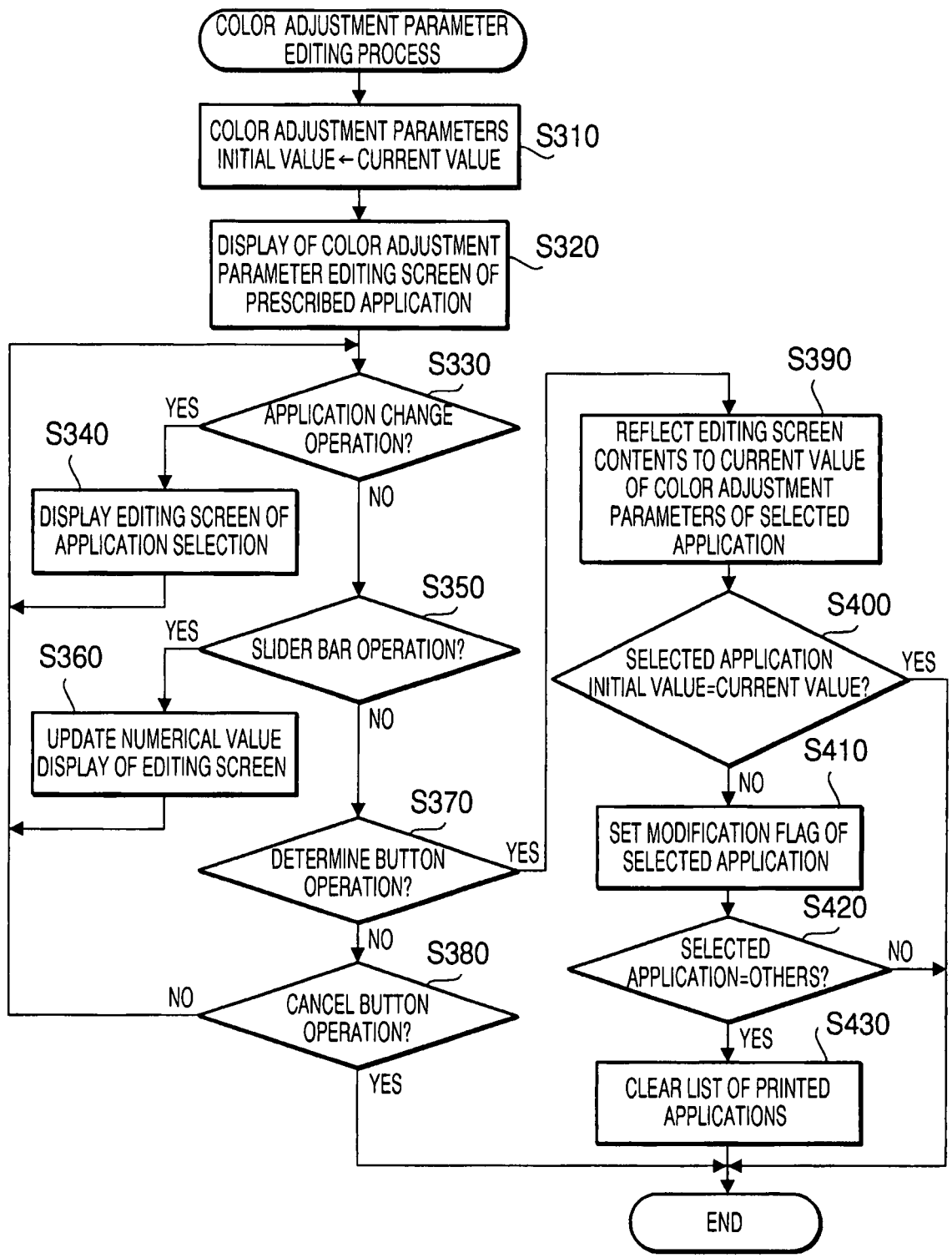
FIG. 15 is a flowchart showing a color adjustment parameter editing process in the fifth embodiment.

FIG. 15 is a flowchart which shows the color adjustment parameter editing process according to the fifth embodiment.

When the process shown in FIG. 15 is activated, firstly, in S310, current setting values of color adjustment parameters of the predetermined application are copied to the area for storing the initial values. Next, in S320, an editing screen 30C where the current setting values of the predetermined application are reflected is displayed on the display unit 16.

The predetermined application may be any application setup preliminarily, or may be an application which was indicated when the enter button 35 was clicked in a previous setting operation.

Next in S330, the process judges whether an operation to switch an application is executed using the text box 34. When such an operation is executed, the process goes to S340, the current setting values of the color adjustment parameters are copied to the initial value area, the current setting values are reflected to the editing screen 30C, and the process returns to S330.

When the operation to switch the application is not executed (S330: NO), the process goes to S350, and the process judges whether the slider bars 31 are operated. If the slider bars 31 are operated, the process goes to S360, numerical values indicated in the display areas 33 of the editing screen are updated according to the status of the operated slider bars 31. If the slider bars 31 are not operated (S350: NO), the process goes to S370.

In S370, the process judges whether the enter button 35 is clicked. If the enter button 35 is clicked, the process goes to S390, contents of the editing screen 30C are reflected to the current setting values of the color adjustment parameters of the application which is indicated in the text box 34 (hereinafter, referred to "selected application").

Next, in S400, the process judges whether the current setting values are equal to the initial values set in S310 or S340. If the current setting values are equal to the initial values, since the color adjustment parameters have not been changed, the process is terminated without doing any operation.

If the current setting values are different from the initial values (S400: NO), the process goes to S410, and the change flag of the selected application is set in order to show the color adjustment parameters have been changed. Next, in S420, the process judges whether the selected application is "OTHERS".

Figure 17:
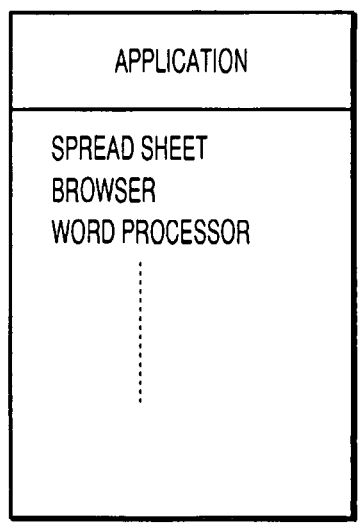
FIG. 17 shows an example of a printed-application list.

If the selected application is not the "OTHERS", the process is terminated without doing anything. If the selected application is the "OTHERS", if the selected application is indicated in a print processed-application list, the indication in the list is cleared, and the process is terminated. The print processed-application list is a list indicating the applications with which printing operations have been executed with the color adjustment parameters being used. FIG. 17 shows an example of the print processed-application list.

In previous S37, if it is determined that the button 35 has not been clicked, the process goes to S380, and judges whether a cancel button 37 is clicked. If the cancel button 37 has not been clicked, the process returns to S330. If the cancel button 37 has been clicked, the process is terminated without doing anything.

In the above-described process, via the editing screen 30C, it is possible to set the color adjustment parameters for each of application, and the application of which the color adjustment parameters have been changed is deleted from the print processed-application list.

<Print Process>

Figure 16:
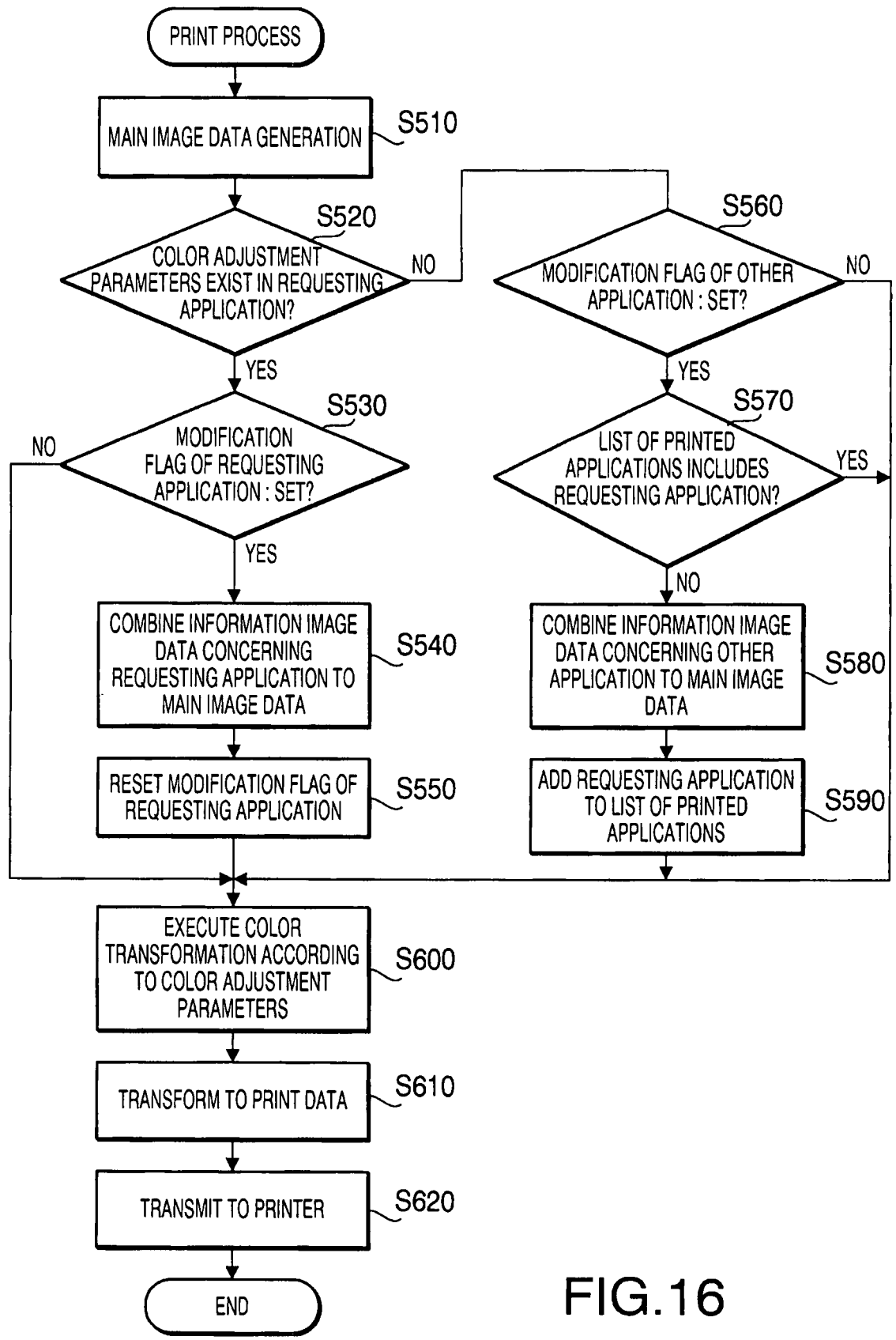
FIG. 16 is a flowchart showing a print process in the fifth embodiment.

FIG. 16 is a flowchart showing the print process according to the fifth embodiment.

When the print process is activated, in S510, the image data from which the print data (i.e., the main image data) is generated is generated. Next, in S520, the process judges whether there exist the color adjustment parameters of an application which has issued a print instruction (hereinafter, referred to "requiring application"). If there exists such an application, the process goes to S530.

In S530, the process judges whether the change flag regarding the color adjustment parameters of the requiring application has been set. If the change flag has been set, since the color adjustment parameters have been changed, the process goes to S540. If the change flag is not set, since the color adjustment parameters have not been changed, the process goes to S600.

In S540, the image data (information image data) to be printed with characters in accordance with the preliminarily setup color is generated according to the contents of current setting values of color adjustment parameters related to the requiring application. The image data is then combined with the main image data generated in previous S510. Next, in S550, the change flag related to the color adjustment parameters of the requesting application is reset (released), and the process goes to S600.

If it is determined that there are no color adjustment parameters related to the requiring application (S520: NO), the process goes to S560 and judges whether the change flag related to the color adjustment parameters of an application of which a kind is "OTHERS" is set.

If the change flag is set, since the color adjustment parameters related to "OTHERS" have been changed, the process goes to S570. If the change flag is not set, since the color adjustment parameters related to "OTHERS" have not been changed, the process goes to S600.

In S570, it is determined whether the requiring application is included in the print processed-application list. If the application is included in the list, since it is not necessary for the information image to be inserted to the main image, the process goes to S600. If the application is not included, since it is necessary for the information image to be inserted to the main image, the process goes to S580.

In S580, the information image data to be printed with characters having a preliminarily set color is generated according to the current setting values of color adjustment parameters for the application categorized in "OTHERS." Then, the information image data is combined with the main image data generated in S510. Next, in S590, the requesting application is added to the print processed-application list, the change flag related to color adjustment parameters the application categorized in "OTHERS" are reset, and the process goes to S600.

In S600-S620, similarly in S250-270 of the first embodiment, the color transformation is executed according to the current setting values of the color adjustment parameters corresponding to the requiring application (S600). Then, the color-transformed image data is transformed into the print data (S610). The print data is then transmitted to the printer 20 via the printer port I/F 17 (S620), and the process is terminated.

According to the fifth embodiment, the color adjustment parameters can be set for each kind of applications. Therefore, it is possible to adjust image quality according to characteristics of each application.

In the embodiment, a type of "OTHERS" is included in a categorization of applications. It may be modified such that a new categorization can be registered when there is no appropriate category is included in the selectable candidates.

It should be noted that the invention is not limited to the above-described illustrative embodiments. Various embodiments/modifications can be made within the scope of the invention.

For example, in the above described embodiments, transformation of image data to print data is executed by the personal computer 10. This configuration may be modified such that the transformation is performed by the printer 20. In such a case, the color adjustment parameters necessary for transformation may be transmitted to the printer 20 together with the image data.

In the above embodiments, the information image is printed on the same side of the printing sheet where the main image is printed. If the printer 20 can print both sides of the printing sheet and the main image is printed only one side thereof, the information image may be printed on the other side of the sheet.

Figure 18:
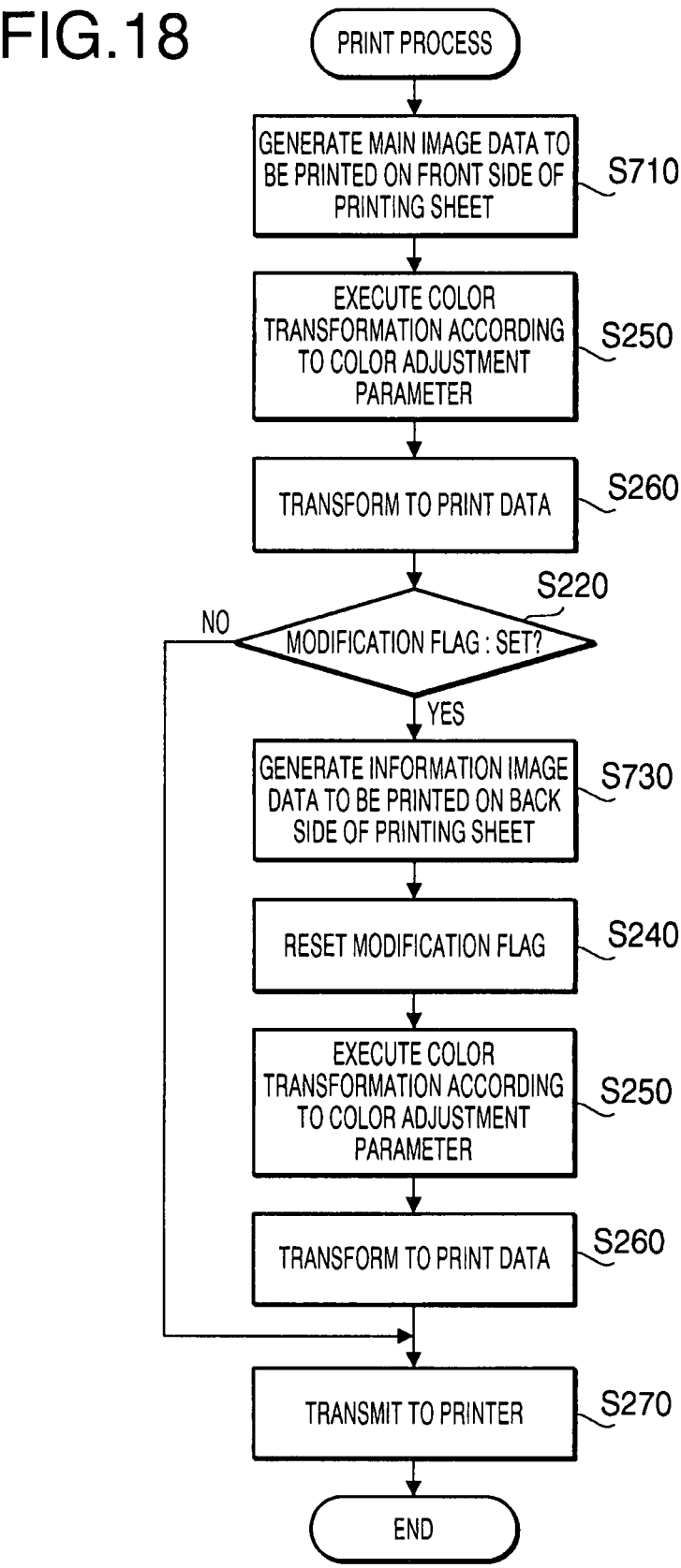
FIG. 18 is a flowchart showing a print process according to a modification of the first embodiment.

FIG. 18 shows an example of such a modification. That is, FIG. 18 is a modified print process which is a modification of the print process shown in FIG. 5. In FIG. 18 and description below, the steps that are the same as those of FIG. 5 are assigned to the same step number used in FIG. 5 and description thereof is omitted for brevity.

S710 corresponds to S210 of FIG. 5. In S710, the process generates main image data to be printed on the front side of the printing sheet. After execution of S710, steps S250 and S260 follow, which are similar to those in FIG. 5. Then, the process judges whether the modification flag is set (S220). If the modification flag is not set (S220: NO), the process proceeds to S270 and then the process is terminated. If the modification flag is set (S220: YES), the process proceeds to S730, in which the information image data to be printed on the back side of the printing sheet is generated. Then, in S240-S250 are executed so that the information image is transformed to the print data, which is also transmitted to the printer.

What is claimed is:

1. An image forming system, comprising:
   a processing unit;
   a memory that stores computer-executable instructions that when executed by the processing unit cause the image forming system to function as
      a setting unit that allows a user to set color adjustment parameters to be used to print out a main image according to main image data;
      an information image data generating unit that generates information image data representing values of the color adjustment parameters when a user sets the color adjustment parameters to be used to print out the main image;
      a print data generating unit that generates print data based on the main image data;
      a drawing area data generating unit that generates drawing area data based on the main image data, the drawing area data representing a drawing area where characters or figures are formed in the main image;
      a judgment unit that identifies a marginal area of the main image, the marginal area being an area of the main image other than the drawing area and which constitutes a blank space, and determines whether an information image represented by the information image data is to be printed in the marginal area;
      a combining unit that combines the information image data with the main image data based on the determination made by the judgment unit, to generate combined image data when a user sets the color adjustment parameters to be used to print out the main image; and
      a printing unit that prints the print data generated by the print data generating unit,
         wherein, when a user sets the color adjustment parameters to be used to print out the main image, the print data generating unit generates the print data by performing color conversion of the combined image data in accordance with the color adjustment parameters set by the user, and the printing unit prints an image according to the main image data and the information image represented by the information image data in the main image.

2. The image forming system according to claim 1, wherein the color adjustment parameters are set for each type of application used for generating the main image data.

3. The image forming system according to claim 1, wherein the color adjustment parameters are set for each attribute of the main image data.

4. The image forming system according to claim 3, wherein the information image shows values of the color adjustment parameters for each of the attributes.

5. The image forming system according to claim 1, wherein the combining unit combines the information image data with the main image data such that the information image is printed by the printing unit in a predetermined area of the main image.

6. The image forming system according to claim 1, wherein the combining unit combines the information image data with the main image data such that the information image data is printed in an area of a printing sheet where no object of the main image is printed.

7. The image forming system according to claim 1, wherein the combining unit combines the information image data with the main image data a predetermined number of times.

8. The image forming system according to claim 7, wherein the computer-executable instructions that when executed by the processing unit further cause the image forming system to function as a count setting unit that sets the number of times by which the information image data is to be combined with the main image data.

9. The image forming system according to claim 1, wherein characters contained in the information image data are printed in a predetermined color.

10. A method of printing an image, comprising the steps of:
    allowing a user to set color adjustment parameters to be used to print out a main image according to main image data;
    generating information image data representing values of the color adjustment parameters when a user sets the color adjustment parameters to be used to print out the main image;
    generating print data based on the main image data;

generating drawing area data based on the main image data, the drawing area data representing a drawing area where characters or figures are formed in the main image;

identifying, by a processor, a marginal area of the main image, the marginal area being an area of the main image other than the drawing area and which constitutes a blank space and determining whether an information image represented by the information image data is to be printed in the marginal area;

combining the information image data with the main image data based on the step of determining, to generate combined image data when a user sets the color adjustment parameters to be used to print out the main image; and printing the generated print data, wherein, when a user sets the color adjustment parameters to be used to print out the main image, the print data generating step generates the print data by performing color conversion of the combined image data in accordance with the color adjustment parameters set by the user, and the printing step prints an image according to the main image data and the information image represented by the information image data in the main image.

11. The method according to claim 10, wherein the combining step combines the information image data with the main image data such that the information image data is printed in an area of a printing sheet where no object of the main image is printed.

12. The method according to claim 10, wherein the combining step combines the information image data with the main image data a predetermined number of times.

13. A non-transitory recording medium containing a computer program representing instructions which, when the computer program is executed by a computer, cause the computer to:

allow a user to set color adjustment parameters to be used to print out a main image according to main image data;

generate information image data representing values of color adjustment parameters when a user sets the color adjustment parameters to be used to print out main image data;

generate drawing area data based on the main image data, the drawing area data representing a drawing area where characters or figures are formed in the main image;

identify a marginal area of the main image, the marginal area being an area of the main image other than the drawing area and which constitutes a blank space;

determine whether an information image represented by the information image data is to be printed in the marginal area;

combine the information image data with the main image data based on the determination, to generate combined image data when a user sets the color adjustment parameters to be used to print out the main image; and print the generated print data, wherein, when a user sets the color adjustment parameters to be used to print out the main image, the instructions cause the computer to generate the print data by performing color conversion of the combined image data in accordance with the color adjustment parameters set by the user, and the instructions cause the computer to print an image according to the main image data and the information image represented by the information image data in the main image.

14. The recording medium according to claim 13, wherein the instructions, when the computer program is executed by the computer, further cause the computer to combine the information image data with the main image data such that the information image data is printed in an area of a printing sheet where no object of the main image is printed.

15. The recording medium according to claim 13, wherein the instructions, when the computer program is executed by the computer, further cause the computer to combine the information image data with the main image data a predetermined number of times.

* * * * *